Aug. 29, 1939.   C. D. RYDER   2,170,874

MULTICOLORED LENS

Filed Nov. 10, 1937

INVENTOR
CHARLES DANIEL RYDER
BY
ATTORNEYS

Patented Aug. 29, 1939

2,170,874

UNITED STATES PATENT OFFICE 2,170,874

MULTICOLORED LENS

Charles D. Ryder, Covington, Ky., assignor to The National Colortype Company, Bellevue, Ky., a corporation of Kentucky Application November 10, 1937, Serial No. 173,734

8 Claims. (Cl. 40—130)

My invention relates to lenses and reflectors and in particular to lenses and reflectors presenting a variety of reflector effects, depending upon the distance of the lenses and the reflectors from the source of light which is being reflected.

The object of my invention is to provide light-reflecting lenses which will present a different appearance according to the distance therefrom of the source of light that is reflected.

It is an object to provide lenses and reflectors so arranged, when embodying this invention, that they convey different messages to the observer adjacent the source of the light which is reflected depending upon the distance of that source of light from the lenses and their reflectors. For instance, one sign design or message appears, when using this invention, if the observer is driving an automobile whose lights are at a distance from the lens and its reflector so that the cone of light strikes the reflector at the center thereof because the incident rays are parallel with the optical axis of the lens or nearly so; and a different message will appear when the car approaches closer to the sign containing these lenses and reflectors, at which time the angle of incidence having increased, the apex of the cone of light will move from the center area of the reflector to a marginal area.

It is a further object of this invention to provide masks for the areas which are not to be actively illuminated on the reflector so that only that portion of the reflector will reflect light upon which the apex of the cone of light is applied.

It is an object to provide either a spherical or an aspherical lens, preferably the latter, with a reflector at approximately the apex of a cone of light, the reflector having its surface so treated in certain areas as to control the reflection of the light.

Referring to the drawing.

Figure 1:
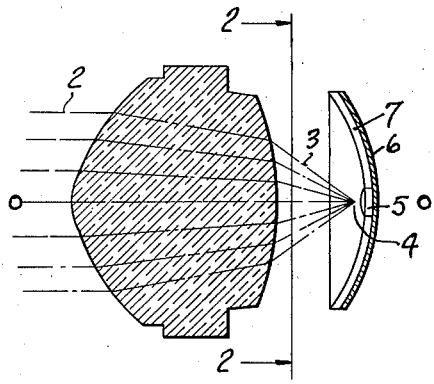
Figure 1 is a section through an aspherical lens, a reflector, and a mask over the reflector at all points except the center of the reflector where the apex of a cone of light is applied to the reflector surface because the source of light is so remote that the incident rays are parallel with the optical axis of the lens or nearly so.
Figure 3:
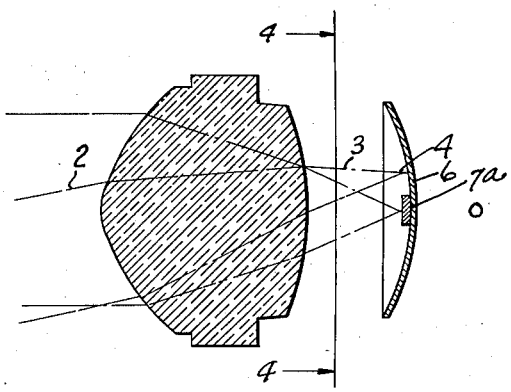

Figure 3 is a view similar to Figure 1 showing an aspherical lens in combination with a reflector, the center of which is masked and the marginal portion of which is uncovered, illustrating how the light is reflected from the marginal portion of the reflector when the source of light is at an angle to the optical axis of the lens, the source of light being closer to the lens than in Figure 1. In this view the apex of the cone of light is upon the polished reflecting surface on the margin of the reflector.

Figure 2:
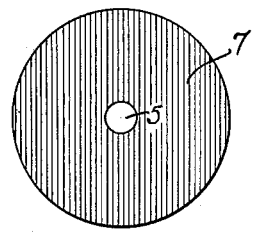
Figure 2 is a section on the line 2—2 of Figure 1 looking in the direction of the arrows illustrating a front elevation of the reflector of Figure 1 with the center portion uncovered for reflection and the marginal portion masked.
Figure 4:
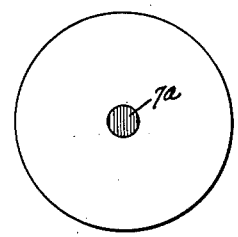

Figure 4 is a view similar to Figure 2 on the line 4—4 of Figure 3 looking in the direction of the arrows, showing in elevation the reflector with the center portion thereof masked.

Figures 5, 6:
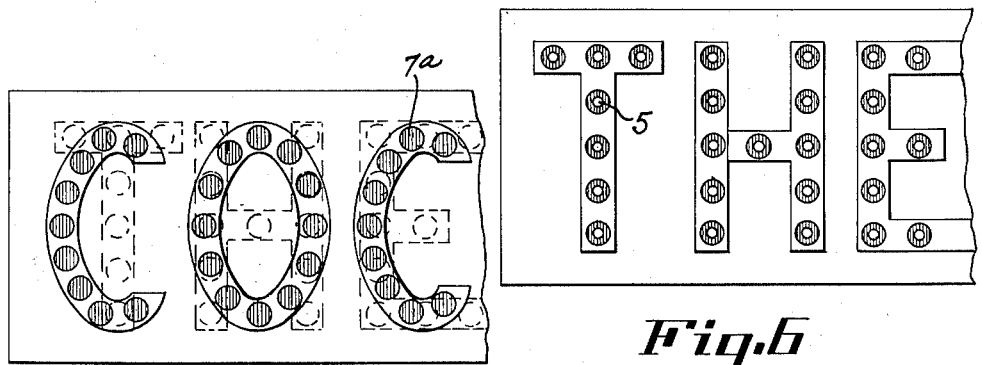

Figure 5 illustrates the arrangement of lenses and reflectors to bring out a message when an automobile headlight is at a considerable distance from the sign when the reflectors of the type shown in Figures 1 and 2 are employed. In this view in dotted lines are indicated the position of the reflectors and the letters of the message such reflectors are intended to convey when the source of light is at an angle to the optical axis of the lenses and reflectors, as in Figures 3 and 4, and the reflectors are masked, as shown in Figures 3 and 4.

Figure 6 shows in full lines the sign and its message as conveyed by the reflectors. The lenses are omitted showing a group of reflectors, masked as shown in Figure 2, arranged to spell out the word THE. In this figure the reflectors are masked around their marginal portions so as to reflect only incident rays which approach the reflectors substantially parallel to the optical axis of a lens placed in front of the reflector, as illustrated in Figure 1. Light coming from a distant source in front of the reflectors shown in Figure 6 is reflected back from the central unmasked portion.

It will be understood, of course, that when I use the term "mask", while I am primarily referring to covering a portion of the reflector, yet I may place different colored transparent or translucent mediums over the reflector to produce different lighting effects, as well as place an opaque covering thereover on certain parts of the reflector. Again, I can secure the same result by limiting the size of the reflector rather than having a reflector of standard size and masking a portion of it. Again, I may secure the same result by successively presenting reflectors of the character described with different masks behind a series of lenses at intervals in order to bring about the effect of different messages, apparent movement of the design, etc.

Referring to the drawing in detail, I designates an aspherical lens. The lens may be of a spherical type, but an aspherical lens is preferred. The rays of light from a distant source are designated 2. They are converged into a cone 3, the apex of which at 4 is adjacent the reflecting surface 5 of the reflector 6. Around this reflecting surface 5 mounted upon the surface of the reflector 6 is a mask 7 which leaves only the space 5 uncovered so that it is light-reflecting. The non-reflecting character of the mask has been indicated by vertical lines as a diagrammatic means of so indicating the different character of the area in question.

As the source of light, which is usually that from an automobile headlight, comes closer to the combination of the lens and reflector, the rays 2, as in Figure 3, are directed at an angle to the optical axis o—o, as to which they are substantially parallel when they are at a distance from the lens and reflector. This places the apex of the cone of light 4 upon the surface of the reflector 6, which in this case is uncovered or unmasked, while the center portion has a mask 7a. The result is that the lenses and reflectors of Figures 1 and 2 are active when the source of light is at a distance and inactive when it is close, while the reverse is true of the combination of lenses and reflectors of Figures 3 and 4.

Thus by the selection and arrangement of lenses and reflectors of the two types, it is possible to have one group of lenses and reflectors light-reflecting to a source of light at a distance while the other group is inactive, and when the source of light comes closer to the sign, then the active group of the type of Figures 1 and 2 becomes inactive and the lenses and reflectors of the type shown in Figures 3 and 4 become active and light-reflecting.

The result is that a variety of messages are thus presented successively to the driver of an automobile and the passengers who are adjacent the source of the light that is thus reflected. One message is conveyed from those lenses and reflectors as in Figures 1 and 2 when the incident rays from the automobile are parallel with the optical axis of the lens, or nearly so. Another message will be conveyed when the car is closer to the sign so that the angle of incidence is increased to bring a movement of the apex of the cone of light onto a marginal portion of the reflector.

This arrangement is shown in Figures 5 and 6. In Figure 5 the lenses and reflectors of the type shown in Figures 1 and 2 will spell the letters THE at a distance. The letters COC will not show up at that distance. When the car approaches closer to the sign, the THE lenses and reflectors will darken and the COC lenses and reflectors of the type shown in Figures 3 and 4 will be illuminated. The combinations as the result of applying the principle of this invention are endless. Different types of masks and reflectors, whether stationary or movable, may be utilized to work out different types of light-reflecting designs and messages apparent to the observer at different distances.

It will be understood that I desire to comprehend within my invention such modifications as come within the scope of the claims and the invention.

Having thus fully described my invention, what I claim as new and desire to secure by Letters Patent, is:

1. In combination, a plurality of lenses and reflectors arranged in pairs so that light rays incident to the lenses will be focused on a sector of the reflector, a group of said reflectors having masks over the marginal faces of the reflectors, and another group of said reflectors having masks over the center portion of the reflectors, whereby light is reflected from distant sources by the first group of lenses and reflectors and light is reflected from relatively near sources by the second group of lenses and reflectors.

2. In combination, a plurality of aspherical lenses and reflectors arranged in pairs so that light rays incident to the lenses will be focused on a sector of the reflector, a group of said reflectors having masks over the marginal faces of the reflectors, and another group of said reflectors having masks over the center portion of the reflectors, whereby light is reflected from distant sources by the first group of lenses and reflectors and light is reflected from relatively near sources by the second group of lenses and reflectors.

3. In combination, lenses and reflectors arranged in pairs whereby the apex of the cone of light rays passing through the lenses and reflected back through the lenses by the reflectors is arranged adjacent to the surface of the reflectors, reflectors of such curvature as to so reflect the light rays from different points on the surface thereof depending upon the angularity of the rays of light from the light source with respect to the optical axis of the lens through which the rays pass, and light-absorbing masks arranged over portions of the surface of said reflectors so that certain of said reflectors reflect only light originating at a distance and others reflect only light originating relatively near to the lenses and reflectors.

4. In combination, aspherical lenses and reflectors arranged in pairs whereby the apex of the cone of light rays passing through the lenses and reflected back through the lenses by the reflectors is arranged adjacent to the surface of the reflectors, reflectors of such curvature as to so reflect the light rays from different points on the surface thereof depending upon the angularity of the rays of light from the light source with respect to the optical axis of the lens through which the rays pass, and light-absorbing masks arranged over portions of the surface of said reflectors so that certain of said reflectors reflect only light originating at a distance and others reflect only light originating relatively near to the lenses and reflectors.

5. In combination, a plurality of aspherical lenses and reflectors so arranged that the apex of a cone of light rays which have passed through the lenses will be adjacent the surface of the reflectors, means of rendering inactive a portion of each of said reflectors whereby certain of said reflectors will reflect light only when the light rays strike the central portion thereof, whereas other reflectors will only reflect rays of light which strike the lens at an angle to the optical axis of the lens.

6. In combination, a plurality of aspherical lenses and reflectors so arranged that the apex of a cone of light rays which have passed through the lenses will be adjacent the surface of the reflectors, means of rendering inactive the marginal portion of certain of said reflectors whereby said reflectors will reflect light, the rays of which are substantially parallel to the optical axis of the lens, and means of rendering inactive the central portion of other reflectors whereby they will reflect rays of light which strike the lens at an angle to the optical axis of the lens.

7. In a method of conveying messages by signs having a plurality of lenses and reflectors, said lenses being adapted to converge light rays so that the apex of the cone thereof will travel over the surface of an arcuate reflector, the steps of (a) moving a light source transversely of the optical axis of the lenses; (b) masking the marginal portions of the reflectors, leaving the centers thereof exposed; (c) masking the centers of other reflectors while leaving the marginal portions exposed; and (d) so arranging said lenses and their reflectors according to their type of maskings so as to convey different messages according to the angular position of the light source with respect to the optical axis of the lenses and their reflectors.

8. In a method of conveying messages by signs having a plurality of aspherical lenses and reflectors, said lenses being adapted to converge light rays so that the apex of the cone thereof will travel over the surface of an arcuate reflector, the steps of (a) masking the marginal portions of the reflectors, leaving the centers thereof exposed; (b) masking the centers of other reflectors while leaving the marginal portions exposed; and (c) so arranging said lenses and their reflectors according to their type of maskings so as to convey different messages according to the angular position of the light source with respect to the optical axis of the lenses and their reflectors.

CHARLES D. RYDER.